(12) United States Patent
Bergsten et al.

(10) Patent No.: US 12,278,749 B2
(45) Date of Patent: Apr. 15, 2025

(54) METHOD AND SYSTEM FOR ESTIMATING COMMUNICATION LATENCY

(71) Applicant: Juniper Networks, Inc., Sunnyvale, CA (US)

(72) Inventors: Anders Bergsten, Gammelstad (SE); Andreas Johansson, Luleå (SE)

(73) Assignee: Juniper Networks, Inc., Sunnyvale, CA (US)

( * ) Notice: Subject to any disclaimer, the term of this patent is extended or adjusted under 35 U.S.C. 154(b) by 250 days.

(21) Appl. No.: 17/760,248

(22) PCT Filed: Feb. 5, 2021

(86) PCT No.: PCT/US2021/016936
§ 371 (c)(1),
(2) Date: Aug. 5, 2022

(87) PCT Pub. No.: WO2021/159005
PCT Pub. Date: Aug. 12, 2021

(65) Prior Publication Data
US 2023/0344735 A1 Oct. 26, 2023

(30) Foreign Application Priority Data

Feb. 7, 2020 (SE) .................... 2050133-4

(51) Int. Cl.
*H04L 43/0864* (2022.01)
*H04L 43/106* (2022.01)
(52) U.S. Cl.
CPC ........ *H04L 43/0864* (2013.01); *H04L 43/106* (2013.01)
(58) Field of Classification Search
None
See application file for complete search history.

(56) References Cited

U.S. PATENT DOCUMENTS 6,512,761 B1 * 1/2003 Schuster ............. H04L 12/1485
370/352
8,320,552 B2 11/2012 Kleijn
(Continued)

FOREIGN PATENT DOCUMENTS

CN 1650291 A 8/2005
CN 101394324 A 3/2009
(Continued)

OTHER PUBLICATIONS

Notice of Intent to Grant from counterpart Chinese Application No. 202180012901.0 dated Mar. 6, 2024, 7 pp.
(Continued)

*Primary Examiner* — Hong S Cho
(74) *Attorney, Agent, or Firm* — Shumaker & Sieffert, P.A.

(57) ABSTRACT

A method is described for measuring a communication latency between a first device with a first local clock and a second device with a second local clock, the devices interconnected for digital communication to a network, comprising sending an upstream communication and a downstream communication between the devices, and measuring using said local clocks an upstream send time ($\tau_1$), an upstream receive time ($\tau_2$), a downstream send time ($\tau_3$) and a downstream receive time ($\tau_4$); calculating a first measured delay ($y_1$) as $\tau_2-\tau_1$ and calculating a second measured delay ($y_2$) as $\tau_4-\tau_3$; providing said measured delays ($y_1$, $y_2$) to a recursive filter function arranged to estimate a first latency ($d_1$) and a second latency ($d_2$) based on said measured delays ($y_1$, $y_2$) and on values for the first and second latencies ($d_1$, $d_2$) previously estimated by said recursive filter function, and iterating. The invention also relates to a system and computer software product.

20 Claims, 2 Drawing Sheets

(56) References Cited

U.S. PATENT DOCUMENTS

| | | | |
|---|---|---|---|
| 9,501,093 B2* | 11/2016 | Rojas-Cessa | H04J 3/0658 |
| 2004/0056210 A1 | 3/2004 | Scherer | |
| 2007/0217343 A1 | 9/2007 | Znamova et al. | |
| 2015/0281028 A1 | 10/2015 | Akhter et al. | |
| 2016/0112974 A1 | 4/2016 | Shenoi | |
| 2018/0366101 A1 | 12/2018 | Deshpande et al. | |

FOREIGN PATENT DOCUMENTS

| | | |
|---|---|---|
| CN | 102318328 A | 1/2012 |
| CN | 103888237 A | 6/2014 |
| CN | 108540346 A | 9/2018 |
| CN | 108683472 A | 10/2018 |
| EP | 1936867 A1 | 6/2008 |
| WO | 03094037 A1 | 11/2003 |

OTHER PUBLICATIONS

Response to Office Action dated Jul. 20, 2023, from counterpart Chinese Application No. 202180012901.0 filed Dec. 4, 2023, 8 pp.
International Preliminary Report on Patentability from International Application No. PCT/US2021/016936 dated Aug. 18, 2022, 10 pp.
Han et al. et al., "Minimum Control Latency of SDN Controller Placement", IEEE TrustCom-BigDataSE-ISPA, IEEE Computer Society, 2016, pp. 2175-2180, (Applicant points out, in accordance with MPEP 609.04(a), that the year of publication, 2016, is sufficiently earlier than the effective U.S. filing date, so that the particular month of publication is not an issue.).
Search Report from counterpart Application No. PCT/US2021/016936 dated Apr. 26, 2021, 17 pp.
Response to Communication Pursuant to Rules 161(1) and 162 EPC dated Sep. 14, 2022, from counterpart European Application No. 21709268.3, filed Mar. 10, 2023, 18 pp.
First Office Action and Search Report from counterpart Chinese Application No. 202180012901.0 dated Jul. 20, 2023, 8 pp.
Han et al., "Minimum Control Latency of SDN Controller Placement," 2016 IEEE TrustCom/BigDataSE/ISPA, Aug. 23-26, 2016, 6 pp.
Communication pursuant to Article 94(3) EPC from counterpart European Application No. 21709268.3 dated Aug. 19, 2024, 4 pp.
Response to Communication pursuant to Article 94(3) EPC dated Aug. 19, 2024, from counterpart European Application No. 21709268.3 filed Feb. 17, 2025, 11 pp.

\* cited by examiner

METHOD AND SYSTEM FOR ESTIMATING COMMUNICATION LATENCY

This application is a national stage entry under 35 U.S.C. § 371 of International Application No. PCT/US2021/016936, filed Feb. 5, 2021, which claims the benefit of SE Application No. 2050133-4, filed Feb. 7, 2020, the entire content of each of which are herein incorporated by reference.

TECHNICAL FIELD

The present invention relates to a method, a system and a computer software product for estimating communication latency, in particular communication latency between a first and a second network-connected communication device each having their respective independent device clock.

BACKGROUND

The present invention is applicable in the field of monitoring, maintenance and operation of digital communication networks, such as the internet.

In such networks, connected devices communicate with each other. In such communications, there are inevitably latencies. Such latencies occur bidirectionally, in other words for any particular roundtrip communication between two connected devices there are two latency delays involved.

In many situations, it is important to be able to accurately estimate these latencies. For instance, it may be desirable for an automatic monitoring system to be able to receive an early warning that a communication latency between two particular connected devices has increased, to be able to quickly take appropriate action. In other examples, accurate latency information constitutes useful input when planning and/or developing network designs or implementing networked system solutions, since such latencies may affect performance in various ways that need to be considered to be able to reach satisfying performance.

It may also be desirable to synchronise the respective local clock of two devices, for improved interoperability or specific network based tasks requiring accurate time synchronisation.

There are various known ways of measuring communication latencies, normally using dedicated probing messages sent between the connected devices in question. This introduces additional network traffic, which is not desirable.

Normally, each connected device has its own internal system clock, which is generally not synchronised across connected devices. In other words, each device has no way of knowing whether the system clock of a different device has an accurate, or the same, sense of the current time. This complicates the process of measuring communication latency between such connected devices.

Furthermore, communication latencies between different connected devices typically change and fluctuate over time, not only due to different properties of the various system clocks of devices but also due to the nature of the communication network. For instance, communication paths will normally involve additional connected devices in unpredictable ways, and communications may be rerouted to different paths without notice and outside of the control of operators of the devices in question. In addition, overall network load may fluctuate over time.

SUMMARY

Hence, it would be desirable to be able to achieve an accurate measurement of a current communication latency between a pair of network connected devices, both upstream and downstream, that provides reliable measurement results under said unpredictable and changing network and communication conditions.

The present invention solves the above-described problems.

Hence, the invention relates to a method for measuring a communication latency between a first and a second device, which first device has a first clock being local to the first device, which second device has a second clock being local to the second device, which first and second devices are both connected for digital communication to a digital communication network, wherein the method comprises the steps a) sending a first communication from the first device to the second device, measuring a first communication send time using the first clock and measuring a first communication receive time using the second clock; b) sending a second communication from the second device to the first device, measuring a second communication send time using the second clock and measuring a second communication receive time using the first clock; c) calculating a first measured delay as the difference between the first communication receive time and the first communication send time and calculating a second measured delay as the difference between the second communication receive time and the second communication send time; d) providing said first measured delay and said second measured delay to a recursive filter function arranged to estimate a first latency and a second latency based on said first measured delay, said second measured delay, a value for the first latency previously estimated by said recursive filter function and a value for the second latency previously estimated by said recursive filter function, and e) iterating from step a.

Furthermore, the present invention relates to a system for measuring a communication latency between a first and a second device, which first device has a first clock being local to the first device, which second device has a second clock being local to the second device, which first and second devices are both connected for digital communication to a digital communication network, which system comprises a recursive filter means, wherein the system is arranged to, iteratively receive or record a measurement of a first communication send time measured using the first clock and a first communication receive time measured using the second clock, which measurements are made in relation to a first communication sent from the first device to the second device; receive or record a measurement of a second communication send time measured using the second clock and a second communication receive time measured using the first clock, which measurements are made in relation to a second communication sent from the second device to the first device; calculate a first measured delay as the difference between the first communication receive time and the first communication send time, and calculate a second measured delay as the difference between the second communication receive time and the second communication send time; and estimate, using the recursive filter means, a first latency and a second latency based on said first measured delay, said second measured delay, a value for the first latency previously estimated by said recursive filter means and a value for the second latency previously estimated by said recursive filter means.

Moreover, the present invention relates to a computer software product for measuring a communication latency between a first and a second device, which first device has a first clock being local to the first device, which second device has a second clock being local to the second device, which first and second devices are both connected for digital communication to a digital communication network, which computer software product is arranged to, when executed on one or several computer processors, perform the steps a) receiving or recording a measurement of a first communication send time measured using the first clock and a first communication receive time measured using the second clock, which measurements are made in relation to a first communication sent from the first device to the second device; b) receiving or recording a measurement of a second communication send time measured using the second clock and a second communication receive time measured using the first clock, which measurements are made in relation to a second communication sent from the second device to the first device; c) calculating a first measured delay as the difference between the first communication receive time and the first communication send time, and calculating a second measured delay as the difference between the second communication receive time and the second communication send time; d) estimating, using a recursive filter function, a first latency and a second latency based on said first measured delay, said second measured delay, a value for the first latency previously estimated by said recursive filter function and a value for the second latency previously estimated by said recursive filter function; and e) iterating from step a.

In the following, the invention will be described in detail, with reference to exemplifying embodiments of the invention and to the enclosed drawings.

DETAILED DESCRIPTION

Figure 1:
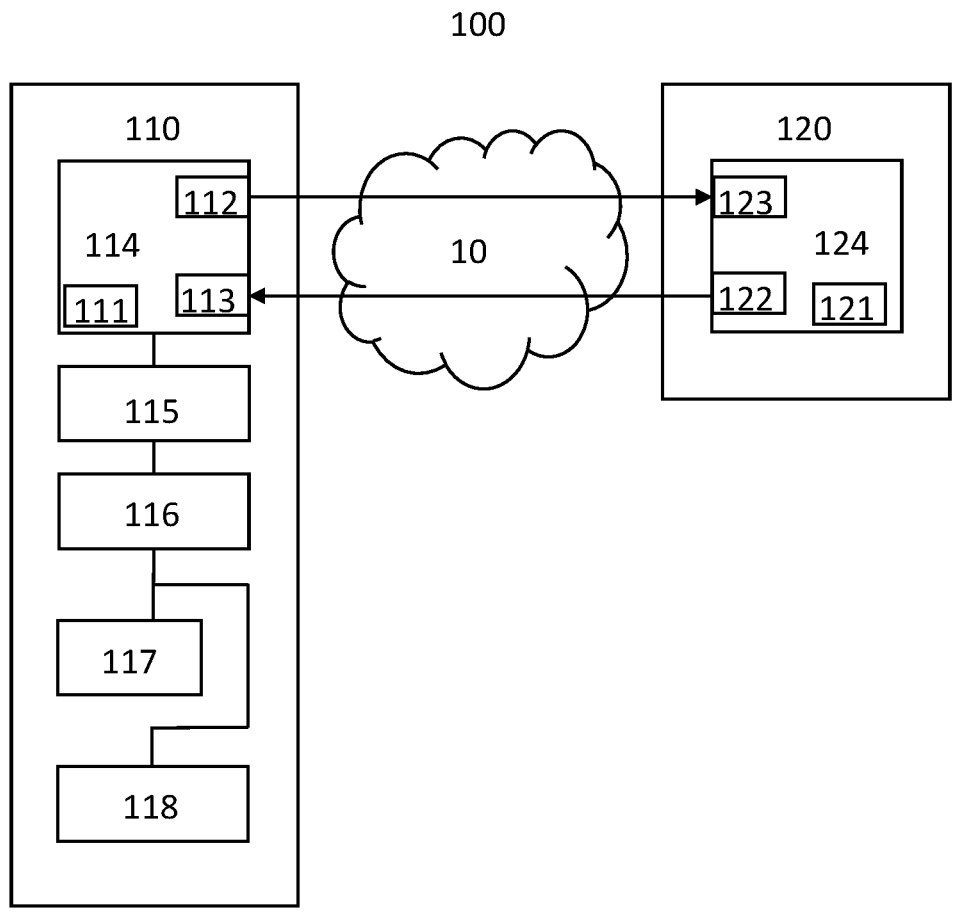
FIG. 1 illustrates a system according to the present invention, suitable for performing a method according to the present invention.

FIG. 1 illustrates a system 100 according to the present invention, for measuring a communication latency between a first 110 and a second 120 device.

The first 110 and second 120 devices are both connected to a digital communication network 10 for digital communication between said devices 110, 120. The network 10 may be the internet, but may also be a local network, such as a virtual or physical private network or any well-defined subpart of the internet. Each of the devices 110, 120 may be a respective hardware device, which in itself may be standalone or distributed, as the case may be. However, it is preferred that both the first 110 and second 120 device are arranged with at least one respective well-defined port 113; 123 for inbound communications and at least one well-defined port 112; 122 for outbound communications. For both devices 110, 120 its inbound port 113; 123 may be the same as the outbound port 112; 122. For both devices 110, 120, said inbound/outbound port may be a hardware port, such as a wired or wireless communication interface. For instance, such an inbound/outbound port may comprise an ethernet circuit and slot connected to a motherboard bus of the device 110, 120 in question. In other examples the port 112, 113; 122, 123 comprises a Wifi antenna. Such communication ports are well-known as such, and will not be described in further detail herein, the important thing being that each round-trip communication between the first 110 and the second 120 device performed at different times will involve the same hardware circuitry in the device 110, 120 in question, even if the communication path taken between the devices 110, 120 may differ between different such round-trip communications. Preferably, the same combination of ports 112, 113; 122, 123 is used across several or all iterations (see below) performed within a method according to the present invention.

It is understood that the first 110 and second 120 devices each may comprise a respective CPU, a respective electronic memory and a respective communication bus for device-internal communication. In particular, each of the first 110 and second 120 devices may be a general-purpose computer device, such as an internet server or client, an IoT sensor or actuator, a network attached storage unit, or any other internet-connected computer device.

In all other respects, the functionality of the first 110 and second 120 devices described herein, as well as the broader functionality of the system 100, may be implemented in software, in hardware or in any suitable combination of software and hardware.

In particular, the first device 110 has a first clock 111, preferably being arranged as a local part of the first device 110 and arranged to measure a local time of the first device 110. Similarly, the second device 120 has a second clock 121, preferably being arranged as a local part of the second device 120 and arranged to measure a local time of the second device 120. The first 111 and second 121 clocks may be non-synchronised in relation to each other. For instance, each of the first 111 and the second 121 clocks may be intermittently synchronised to a respective master clock, which may the same or different for the first 111 and second 121 clocks. In general, the first 111 and second 121 clocks may be arranged in such a way so that it is not possible to reliably predict a local time of the first device 110 only based on knowledge of a local time of the second device 120, and vice versa.

The system 100 further comprises a recursive filter means 117, which will be described in detail below.

Figure 3:
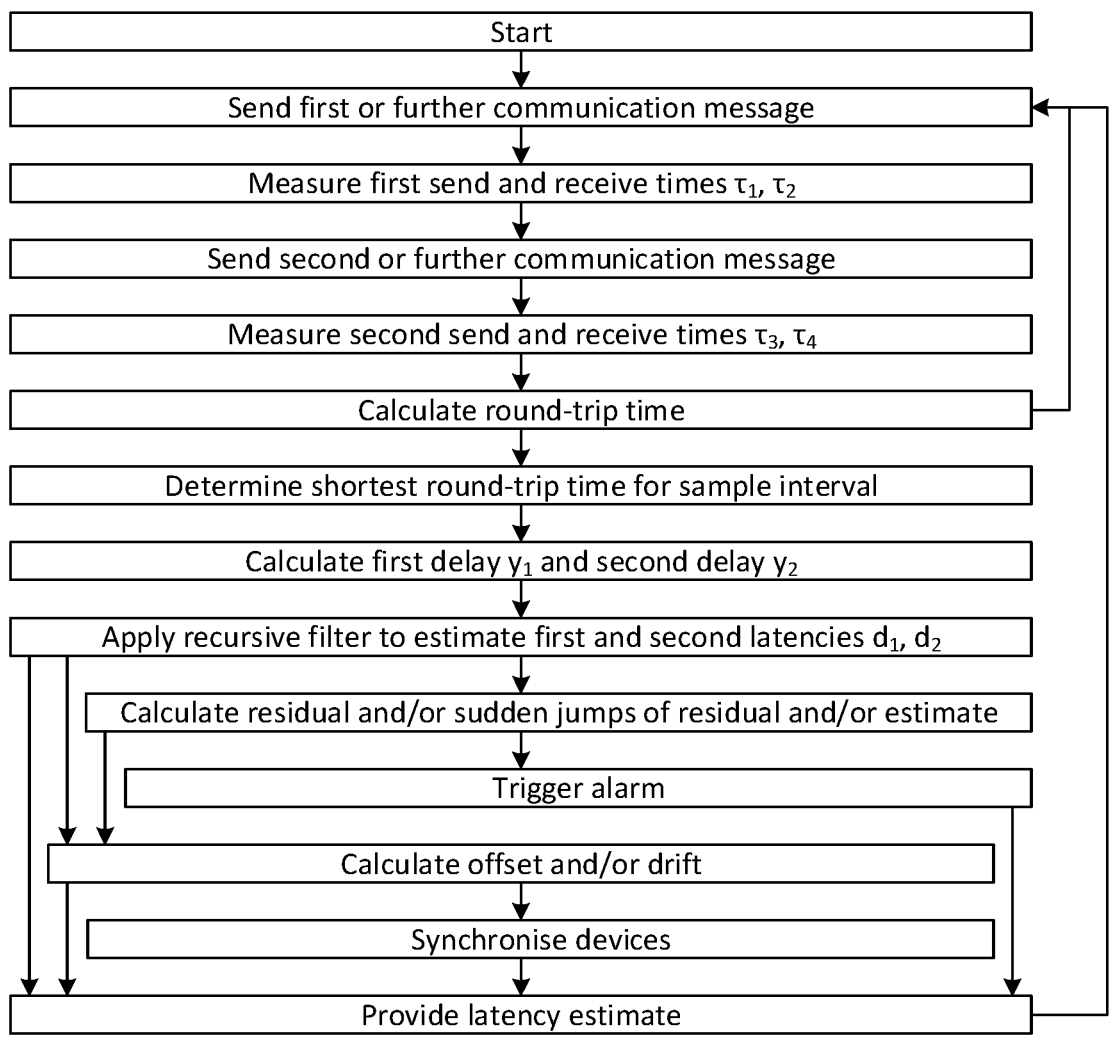
FIG. 3 is a flowchart illustrating a method according to the present invention.

The system 100 is arranged to perform a method according to the present invention, an example of which is illustrated in FIG. 3. In FIG. 1, the system 100 is illustrated as comprising the first device 110 and the second device 120, and much of the functionality of the system 100 is implemented as part of the first device 110. This is one example of a possible implementation of a system 100 according to the present invention, in which the first device 110 may be a master device and the second device 120 may be a corresponding slave device. For instance, the first device 110 may be a network 10 monitoring unit, hardware and/or software and the second device 120 may be any other network-connected unit. Such a master unit 110 may analyse network 10 latency with respect to the slave unit 120, and also to any number of additional network 10 connected slave units or the same or different type.

However, it is realised that, in this and other implementations, the second device 120 may be not a part of the system 100 but instead be completely standalone.

Furthermore, the functionality of the system 100 arranged to perform the method according to the present invention may be not arranged as a part of the first device 110, but may instead be separately arranged in relation to the first device 110 and arranged to communicate with the first device 110 for performing the method steps of a method according to the present invention. Such communication may exploit proprietary protocols for communicating time measurement information, or may use sent information packages for carrying time measurement information as explained below.

Namely, according to a preferred embodiment a method according to the present invention is performed "in-band" in the sense that the communication messages described herein and sent as a part of round-trip time measurements as described below are not sent between the first 110 and the second 120 devices as separate communications only for the purposes of performing the present invention. Instead, these communications are communications that are sent during the course of normal communication between the devices 110, 120, and would as such be sent with a substantially equal or corresponding payload even if the round-trip time measurement being a part of the present method would not take place. For instance, the communications between the devices 110, 120 may be pinging, polling or information transfer communications performed as a part of a separate process which as such may be completely uncorrelated to the round-trip time measurement of the present invention, and may in effect be completely unrelated to the present method in any way apart from the fact that the present method exploits the messages in question for performing said time measurements.

For instance, such "in-band" time measurement may be performed by the use of a software instruction being previously deployed in the respective clock 111, 121, before sending said communication and instructing the respective clock 111, 121 to measure the times described below for the communications in question and to embed the measured time information into the communicated message. Alternatively, software code may be appended to or included in the communicated message itself, causing such time measurement to take place during the course of a normal handling of the communication in question due to the software being executed during the course of the processing of the received message.

There are many different ways of recording time measurements obtained from said clocks 111, 121 and make them available for the deceive 110. Typically, device 110 creates a data packet with four empty fields for time measurements followed by recording clock 111 reading in the first field before sending the data packet to device 120. Immediately upon receiving the data packet, device 120 records clock 121 reading in the second field before further processing the packet. When the packet is ready to be returned to device 110, device 120 again records clock 121 reading and stores the value in the third field. Upon receiving the returned packet, device 110 again records clock 111 reading and stores it in the fourth field. When this cycle is completed, the four fields of the data packet contain the four time measurements which are available for further processing.

Internet draft "Data Fields for In-situ OAM" (https://tools.ietf.org/html/draft-ietf-ippm-ioam-data-08) is a concrete example of a protocol that can be used to record and transport time measurements as described above. It is designed for recording In-situ Operations, Administration, and Maintenance (IOAM) records operational and telemetry information in the packet while the packet traverses a path between two points in the network.

In particular, many internet-connected hardware, such as commercial routers, implement functionality allowing such protocols or message syntax and to perform such time stamping accordingly. In such cases, there is no need to deploy any custom software on the second device 120 in order to perform such measurements.

In other examples, such hardware may support the loading and running of software within a virtual machine on the hardware in question. Then, a custom piece of software belonging to a system of the present type can be loaded into, and executed within, such a virtual machine for performing the second device 120 time-stamping without having to be locally installed directly on an operating system of the second device 120.

Hence, the time-stamping described herein can be performed using a specialized piece of software executing on or from the first 110 and/or the second device 120, or be performed without such software, such as using a protocol or message syntax of the above exemplified type.

In general, it is preferred that the communication messages themselves, between the first 110 and second 120 devices, carry the time measurement information as a part of the communicated message in question, at least for the part of the round-trip message going from the second device 120 to the first device 110.

In general, the method illustrated in FIG. 3 may be performed by a computer software product according to the present invention, which software product may be arranged to execute on hardware of the first device 110, the second device 120, a separate device, or any combination thereof. When hence executed, such a software product may then be arranged to perform the method steps illustrated in FIG. 3, or at least cause these steps to be performed. Analogously, it may be said that it is then the system 100 that performs or causes to perform these steps.

Hence, in a first step, the method starts.

In a subsequent step, a first communication message (upper arrow in FIG. 1) is sent from the first device 110 to the second device 120. In connection to the sending of this first message, a first communication send time $\tau_1$ is measured using the first clock 111, and a first communication receive time $\tau_2$ is measured using the second clock 121.

In a subsequent step, a second communication message (lower arrow in FIG. 1) is sent from the second device 120 to the first device 110. The second communication message may be a message being sent as an explicit response to the first communication message, such as being sent directly in response to the first communication message. For instance, the first communication message may be an information query and the second communication message may be a response to said query, returning queried information from the responding second device 120 to the querying first device 110. In connection to the sending of this second message, a second communication send time $\tau_3$ is measured using the second clock 121, and a second communication receive time $\tau_4$ is measured using the first clock 111.

As mentioned above, it is preferred that the second device 120 adds the first communication receive time $\tau_2$ and the second communication send time $\tau_3$ to the second communication message, in a format allowing the system 100, such as the first device 110, to read this time measurement information from the second communication message for use in subsequent calculations.

In general, the first device 110 may comprise a first measurement module 114 being arranged to perform a first time measurement process in which $\tau_1$ and $\tau_4$ are measured. Similarly, the second device 120 may comprise a second measurement module 124 being arranged to perform a second time measurement process in which $\tau_2$ and $\tau_3$ are measured. Said first and second time measurement processes may each participate in the measurement according to the present invention of latency metrics of the network 10 by intermittently or continuously sending, or observing the sending of, data packets over the computer network 10, including the send/receive time measurement of such sent data packets as described above, wherein each such data packet is sent from the first device 110 to the second device 120; received by the second device 120; resulting in a response sent by the second device 120 to the first device 110; and received by the first device 110. As mentioned, such messages are preferably sent during the course of some other, external process, which process as such may be unrelated to the round-trip time measurements performed according to the present invention, but where said first and second time measurement processes are designed (caused by the system 100) to perform said time measurements while handling the per se unrelated packet sending and receiving.

In other words, the first and second communication messages may each comprise information, or even contain only information, which as such is unrelated to the estimation of the first $d_1$ and second $d_2$ latencies (see below). Furthermore, said information comprised or contained in the first and second communications may as such be unrelated to the measured first $y_1$ and second $y_2$ delays (see below).

As used herein, the term "latency" generally refers to a property of a communication network. Such latency can be constant over time but will normally vary in different ways.

The term "delay", on the other hand, refers to the time difference between send time and receive time of a particular communication. Hence, a communication delay will depend on a network latency but further incorporates various noise.

The communication messages may be any digital, electronic messages, sent using any suitable digital protocol for electronic communication, such as using conventional TCP/IP internet communication.

Furthermore, the communication messages may be observed in well-defined pairs, in which a first upstream communication message, sent from device 110 to device 120, is associated with a corresponding second downstream communication message, sent from device 120 to device 110. Preferably, such a second communication message in such a pair is sent as a direct response to such a first communication message. It is understood that several consecutively communicated such communication message pairs may be used to estimate network 10 latency as described herein.

In the example illustrated in FIG. 1, the system 100, in this case the first device 110, comprises a timestamp module 115 being arranged to record, based on said respective inband-recorded information in each data packet received and processed at the inbound port 113 of the first device 110, the timestamp quadruple ($\tau_1$, $\tau_2$, $\tau_3$, $\tau_4$). This may, for instance, involve the extraction of timestamp data from the received package stored therein using a predetermined data format by the communicating devices 110, 120.

Figure 2:
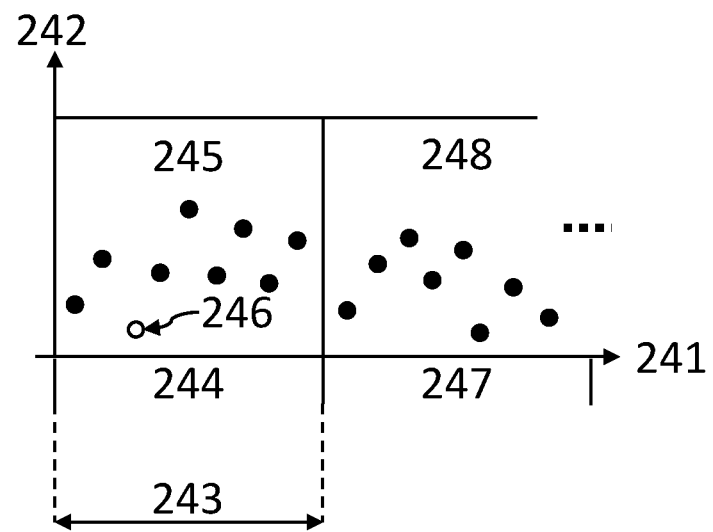
FIG. 2 illustrates a measurement performed in accordance with a method according to the present invention.

As will be described in detail below, the system 100, and in the example of FIG. 1 the first device 110, may further comprise a sampling module 116, being arranged to, in a subsequent step, sample the set of recorded timestamp quadruples ($\tau_1$, $\tau_2$, $\tau_3$, $\tau_4$) obtained throughout each one of a series of sample intervals 244, 247 (see FIG. 2), each sample interval being defined as a certain partition of a first device 110 clock 111 time line X-axis 241. Each sample interval 244, 247 may have a predetermined length, which may be the same or different for different sample intervals. In the example illustrated in FIG. 2, each sample interval 244, 247 have the same predetermined length, defined by a sampling period 243.

A respective round-trip time $\tau_4-\tau_1-(\tau_3-\tau_2)$, measured on a round-trip time Y-axis 242, of the data packets of each of said round-trip samples ($\tau_1$, $\tau_2$, $\tau_3$, $\tau_4$) are then compared, and the particular quadruple 246 of the sampled packets associated with a minimum round-trip time may be determined for each sample, by said sampling module 116. It is noted that this round-trip time is actually calculated not taking into consideration any hold time in the second device 120, by taking the locally measured difference between the receive and send times at the first device 110 and subtracting from this result the locally measured time difference between the send time and the receive time at the second device 120. This will result in the result being unaffected by a hold time at the second device 120, only counting the effective total round-trip transit time for the first and second communication messages. To see this, it may be instructive to ponder the effect of an increased second device 120 hold time under an unchanged transit time. The effect will be an increase of the total time difference between dispatch of the first message from port 112 and reception of the second message at port 113, which increase is exactly the same size as the hold time increase, hence not changing the calculated total round-trip time.

Using a sampling of said general type, the method may hence reiterate back to the step of sending the first communication message, but now using a third, fourth and further communication message, during one and the same sample interval.

In a subsequent step, a first measured delay $y_1$ is calculated as the difference between the first communication receive time $\tau_2$ and the first communication send time $\tau_1$, and a second measured delay $y_2$ is calculated as the difference between the second communication receive time $\tau_4$ and the second communication send time $\tau_3$. These calculations may be made for all measured quadruples ($\tau_1$, $\tau_2$, $\tau_3$, $\tau_4$) or only for the one 246 selected, by the sampling module 116, to have the shortest total round-trip time for each sample interval 244, 247.

In a subsequent step, said first measured delay $y_1$ and said second measured delay $y_2$ are provided to a recursive filter function 117, which in the example of FIG. 1 is illustrated as a part of the first device 110 but, again, may be arranged logically and/or physically externally to the first device 110.

This recursive filter function 117 is arranged to estimate a first (upstream) latency $d_1$, for a communication message to be sent from the first device 110 port 112 to the second device 120 port 123, and a second (downstream) latency $d_2$, for a communication message to be sent from the second device 120 port 122 to the first device 110 port 113. These latencies $d_1$, $d_2$ are estimated based on said first measured delay $y_1$ said second measured delay $y_2$, a value for the first latency $d_1$ previously estimated by said recursive filter function 117 and a value for the second latency $d_2$ previously estimated by said recursive filter function 117. Said previously estimated latency values may preferably be latency estimations performed in the corresponding or identical way for previous communication messages sent between the same first 110 and second 120 devices in substantially the same way as the first and second communication messages illustrated by arrows in FIG. 1. Similarly, the values for $d_1$, $d_2$ estimated using the first and second communication messages of FIG. 1 and sample 245 may be used as inputs to the recursive filter function 117 for a subsequent recursion made based on a third and a fourth communication message and a later sample interval 248. These previous and later messages may be not of the same type or not carry the same or corresponding payload. However, it is preferred that such previous and later messages are sent directly between the first 110 and second 120 devices via the network 10 deploying the same network-specific device 110, 120 settings. The communication paths taken for such messages through the network 10 may differ, and this may not even be possible to know from the point of view of the devices 110, 120 or the system 100.

That the filter function 117 is "recursive" means that an output of the filter function 117 is fed back into the filter function 117 in a later, such as an immediately subsequent, iteration of the method using the filter function 117, such as after the next sampling as mentioned above.

Thereafter, the method may again reiterate back to the step of sending a third, fourth or further communication message.

It is understood that, in the way used herein, the term "estimated latency" refers to an estimation of a real latency, in other words the actual time difference between the send time and the receive time of a communication message.

In contrast thereto, a "measured delay" is a delay measured using local clocks 111, 121. Hence, the measured delay may be incorrectly measured, in case the local clocks 111, 121 show different time.

The present inventors have found that, using such a seemingly simple process, it is possible to over time arrive at surprisingly accurate estimations of real network latencies between connected devices 110, 120, in particular when a relative clock setting of the devices 110, 120 in question is not a priori known. Furthermore, such a method has proven to yield accurate results when used in-band, in other words taking advantage of network traffic that would take place anyway, only adding the locally measured timing information to communicated data packages.

In a step performed after the application of the recursive filter 117 and before reiteration of the method back to the sending of the first or further communication messages, the estimated latency information is provided to an external system and/or to a user of the system 100 or the network 10. Such provision may take place continuously as updated estimation data becomes available; intermittently; or upon request by the external system or the user. Uses of this estimated latency data includes planning, developing, monitoring, maintenance and operation of the network 10. The external system may be an automated surveillance system, consuming the estimated network latency information produced by the inventive system 100, detecting patterns according to predetermined rules and/or using neural networks or similar, and setting off alarms or performing network 10 adjustments as a reaction to such detected patterns. For instance, in case network 10 latency between two identified devices 110, 120 increases above a predetermined level, an intermediary network 10 server may be automatically restarted, and/or an alarm may be triggered alerting an operator or an automatic monitoring function of the detected problem. It is realised that such an external system may use the inventive system 100 to automatically monitor large numbers of network 10 connected devices 110, 120, such as at least 100, or even at least 1000, such devices connected to one and the same network 10.

In general, the present method and system can be used as a part of an automatic or semi-automatic monitoring solution, in which delay, latency and/or jitter may be measured and evaluated over time according to the principles described herein and comparison with predetermined threshold values such as defined by applicable service level agreements for the monitored network infrastructure. Then, a particular sequence of operations may be automatically performed by the present system if and when such service level agreements are violated or when predetermined threshold values in terms of delay, latency and/or jitter are exceeded. Such sequences of operations may include a healing scenario, wherein a first step may be to stop monitoring, a second step may be to check if all devices involved in providing a particular service are in sync, a third step may be to redeploy the service in question (including all involved devices), a fourth step may be to run an activation test followed by finally restarting the monitoring procedure. Such a sequence of operations may be performed fully or partly automatically by the present system, such as by the first device 110 or a supervising system entity. Another example of a sequence of operations is a healing and troubleshooting scenario, wherein a first step may be to stop monitoring, a second step may be to attempt a redeploy the service, a third step may be to start a troubleshooting procedure covering the network layer and network location in question. Again, these steps may be performed fully or partly automatically, including said troubleshooting that may be performed automatically for instance based on predefined test cases to be run in a particular sequence with the aim of more precisely identifying a problem.

In general, latency is one of the key metrics for most applications in a computer network. It is therefore important to monitor latency closely, and to make sure it is kept within certain predetermined limits. If there is a latency issue (too high latency), it is important to be able to quickly find and fix the root cause of that issue. Also, being able to understand the latency in each traffic direction will help in the work of resolving the issue and restoring the latency to an acceptable level. Therefore, the present invention may preferably comprise providing continuously or intermittently updated information regarding recent latency measurements in both communication directions.

Furthermore, the present inventors have found that the recursive filter function 117 may be designed in various ways. For one thing, the recursive filter function 117 may advantageously be designed at least based on one or several of a number of assumptions. This achieves a simple filter design, being implementable with low CPU footprint, while still yielding accurate results. Below, detailed examples will be provided, while we in this section of the application merely present the main such assumptions discovered by the present inventors.

Hence, a first such assumption is that a difference $\delta$ between the first latency $d_1$ and the second latency $d_2$ is constant over the steps of sending said first and second communications in one single iteration of the method. In other words, the filter 117 is constructed using the assumption that a difference $\delta(t)=d_1(t)-d_2(t)$ is constant across the interval $[t_1, t_4]$, where $t_i$ is an actual (objective) time at which the measurement of $\tau_i$ is made for i=1 . . . 4.

A second such assumption is that said difference $\delta$ decreases across iterations of sending consecutive further communication messages back and forth between the devices 110, 120, or is zero, possibly apart from a random term.

A third such assumption is that a time offset O between the first clock 111 and the second clock 121 is constant over the steps of sending said first and second communications in one single iteration of the method. In other words, the filter is constructed using the assumption that the time offset O is constant across the interval $[t_1, t_4]$.

A fourth such assumption is that the second clock 121 is associated with an offset drift T in relation to the first clock 111 and that this offset drift is constant or behaving as a random walk process. It is particularly noted that the third and fourth assumptions can be applied one or both, irrespectively of each other, since the third assumption is valid across one single iteration while the fourth assumption is valid across several iterations (the sending of several consecutive double-directed communication messages between the devices 110, 120, such as across different sample 245, 248 of the above-described type).

In some embodiments, the recursive filter function 117 is arranged to achieve, as an output of the filter function 117 as applied to a first sample 245, a computed estimation of the second clock 121 offset O in relation to the first clock 111 and/or the second clock 121 drift T in relation to the first clock 111. Then, this estimated offset O and/or drift T may be used by the filter function 117 when processing a next sample 248 throughout a next sample interval 247. It is noted that the corresponding may be the case if each sample holds only one communication message in each direction between said devices 110, 120.

In a very preferred embodiment of the present invention, the recursive filter function 117 comprises a Kalman filter used in said estimations of the first latency $d_1$ and the second latency $d_2$. As is well-known as such, a Kalman filter is a recursive tool that can provide an updated estimation of a dynamical state of a system under noisy data conditions. in the present case, the Kalman filter can be used to estimate the updated state of said offset O and/or drift T of the second clock 121 in relation to the first clock 111, and based on these estimations a current network 10 latency can be estimated and expressed using suitable parameters.

In general, a Kalman filter may be used to produce not only an updated estimation of a system state, but also a residual indicating how far from the estimated state is the true system state. Hence, in some embodiments the present method further comprises determining such a residual value with respect to said estimated first $d_1$ and/or second $d_2$ latency, and/or with respect to a sum of the estimated first $d_1$ and second $d_2$ latencies. Such a residual value, or a value calculated based on several such residual values from several iterations (such as a moving average of such residual values) may then be provided as an updated dynamic estimation of the reliability of the network 10 latency estimation provided by the present system 100. For instance, the residual, or a value determined based on the residual, can be provided to an operator of the network 10 or of the system 100 according to the present invention, to be used as a measure of the current reliability of the network 10 latency estimated metrics. In some embodiments, the system 100 may be arranged to trigger an event, such as an alarm, in case the residual or a value determined based on the residual exceeds a certain threshold value, and/or in case the residual or value makes a jump of sufficiently short duration and sufficient magnitude. In other embodiments, such an alarm may be set off in case any estimated network 10 latency metric produced by the system 100 makes a corresponding sufficiently quick and large jump.

In some embodiments, the present method may comprise the step, subsequent to the application of the recursive filter function 117, of calculating said estimated current second clock 121 offset O and/or drift T, in relation to the first clock 111, based on the estimated first $d_1$ and second $d_2$ latencies.

As mentioned above, and as illustrated in FIG. 2, the steps of sending the first and second communications, measuring the related local times $\tau_1$, $\tau_2$, $\tau_3$, $\tau_4$ and calculating said measured delays $y_1$, $y_2$ may be iterated over a predetermined sampling period 243. As a result, several delays $y_1$, $y_2$ will be measured, based on local clock 111, 121 measurements, during one and the same sample interval 244, 247. Then, the shortest first (upstream) measured delay may be used as the first measured delay $y_1$ fed into the recursive filter function 117 and the shortest second (downstream) measured delay may be used as the second measured delay $y_2$ fed into the recursive filter function 117. Alternatively, and as already described above, the first and second measured delays from one and the same communication message pair for which the smallest sum 246 of first and second measured delays may be used as the first $y_1$ and second $y_2$ measured delays provided to the recursive filter function 117.

To the recursive filter function 117, a current sample 245 timestamp may be provided, representing a system-global time period at which the measured delays $y_1$, $y_2$ were observed. In some embodiments, this current sample 245 timestamp may be determined in relation to the predetermined sampling period 243 (or expressed differently: in relation to the current sample interval 244), rather than in relation to the actual measurement time, within the sampling period 243, of the first $y_1$ or second $y_2$ measured delays provided to the recursive filter function 117. In other words, in such cases the current sample 245 timestamp is determined based on a temporal location of the sample 245 or the sample interval 244 as such, rather than on the measurement time of one or several delays $y_1$, $y_2$ within that sample 245. For instance, an end time point, a beginning time point or a midpoint of the sample interval 244 within which said measurements were made can be used as the current sample 245 timestamp. Preferably, the same way of determining the sample timestamp is used for all samples 245, 248. Most preferably, these sample timestamps are equitemporally distributed.

The sample time period 243 may be different across different samples 245, 248, but the sample time period 243 is preferably constant, being the same for each sample 245, 248. Suitable sample periods 243 vary with application, but typically the sample period 243 is at least 0.1 seconds, such as at least 1 second, and at the most 100 seconds, such as at the most 10 seconds. The sample time period 243 may be selected so that, for at least for one sample 245, 248, such as for at least 50% of all samples 245, 248 over time, each sample 245, 248 comprises at least 10 measured delay pairs $y_1$, $y_2$. In other words, during such sample(s), at least 10 communication message pairs are sent and measured between the devices 110, 120.

Even though the sample period 243 is preferably selected as a temporally defined period, it is also foreseeable to use as the sample period 243 a predetermined number of processed communication messages, whereby the sample period 243 will be time-variable between different samples 245, 248. Then, each sample 245, 248 may constitute at least 5 samples, such as at least 10 samples.

Using a series of temporally extended samples 245, 248 this way achieves a smaller data and computational footprint, while still achieving reliable network 10 latency estimations.

It is realised that the present method may be iterated indefinitely, the recursive filter function 117 being provided with updated measured delays $y_1$, $y_2$ and producing updated network 10 latency estimates $d_1$, $d_2$ for as long as desired. The present inventors have found that the method may be iterated over at least 10, more preferably at least 100, consecutive recursive filter function 117 iterations (samples 245, 248) to provide very accurate network 10 latency estimations.

Again reverting to FIG. 3, in a further method step, the estimated relative time offset O and the relative offset time drift T between the first clock 111 and the second clock 121 may be used for synchronising the first clock 111 with the second clock 121. In the extension, this may be used for temporally synchronising the first device 110 with the second device 120, for instance as a way to set the second device 120 clock 121 to the same time as the first device 110 clock 121, or to adjust timing parameters for collaboration activities, such as time-critical communication activities, between devices 110, 120.

In such a method for synchronising the first local clock 111 of the first device 110 in relation to the second local clock 121 of the second device 120, the above-described steps of sending the first and second communications; measuring the first and second delay $y_1$, $y_2$; and estimating the first and second latencies $d_1$, $d_2$ are first performed, such as iteratively. Then, said relative time offset O and relative offset time drift T are determined. Thereafter, in a subsequent step said first 111 and second 121 clocks are synchronised based on said relative time offset O and relative time offset drift T.

In practise, the system 100 may comprise a synchronisation module 118 (see FIG. 1, where for exemplary purposes the synchronisation module 118 is implemented as a part of the first device 110), into which each timestamp quadruple ($\tau_1$, $\tau_2$, $\tau_3$, $\tau_4$) obtained is input, and which synchronisation module 118 then computes and outputs a corresponding synchronised timestamp quadruple ($\tau_1$, $\tau_2+\Delta$, $\tau_3$, $\tau_4+\Delta$), where $\Delta=O+T(\tau_1-\tau_{start})$ and $\tau_{start}$ is the value of the first device 110 clock 111 at the start of the current sample interval 244 and where O and T are relative offset and drift as above. Then, the measurements performed in relation to said communication messages sent between devices 110, 120 are synchronised for each data packet sent according to the synchronised timestamp quadruple ($\tau_1$, $\tau_2+\Delta$, $\tau_3$, $\tau_4+\Delta$).

As mentioned above, the invention also relates to the system 100 as such, for measuring a communication latency between devices 110, 120. The system 100 then comprises the recursive filter means 117, and is arranged to, iteratively, perform the following steps:

1) Receive or record the measurements $\tau_1$, $\tau_2$ described above, being measured in relation to the first communication sent from the first device 110 to the second device 120.
2) Receive or record the measurements $\tau_3$, $\tau_4$ described above, being measured in relation to the second communication sent from the second device 120 to the first device 110.
3) Calculate the first and second measured delays $y_1$, $y_2$ as described above.
4) Estimate, using the recursive filter means 117, the first and second latencies $d_1$, $d_2$ as described above.

As also mentioned above, the invention also relates to a computer software product for measuring a communication latency between devices 110, 120. The computer software product may be centralised or distributed, and may comprise several interacting subparts, such as a local application installed and arranged for execution on the first device 110 and/or second device 120 hardware and/or in a central server.

When executed on one or several computer processors, the computer software product is then arranged to perform the following steps:

1) Receive or record the measurements $\tau_1$, $\tau_2$ described above, being measured in relation to the first communication sent from the first device 110 to the second device 120.
2) Receive or record the measurements $\tau_3$, $\tau_4$ described above, being measured in relation to the second communication sent from the second device 120 to the first device 110.
3) Calculate the first and second measured delays $y_1$, $y_2$ as described above.
4) Estimate, using the recursive filter means 117, the first and second latencies $d_1$, $d_2$ as described above.
5) Reiterate from step 1.

In an example of a recursive filter 117 of the above-described type, for use with the first device 110 as a master device and the second device 120 as a slave device, the filter 117 is set out according to the following.

For each current sample, the quadruple with minimum round-trip time of the current sample at the end of the current sample interval is input to the recursive filter 117, that then computes and outputs the slave clock offset O and slave clock drift T to be used when processing the next sample throughout the next sample interval, wherein t denotes true time and $t_1$, $t_2$, $t_3$, $t_4$ are the true time instants when the packet is sent from the master device, received by the slave device, sent from the slave device, and received by the master device, respectively; wherein $d_1$ is the upstream latency (estimated by $t_2-t_1$) from master to slave; $d_2$ is the downstream latency (estimated by $t_4-t_3$) from slave to master, and wherein $\tau_m(t)$ and $\tau_s(t)$ are independent clock signals corresponding to the master clock and the slave clock, respectively. Hence, this yields $\tau1=\tau_m(t_1)$, $\tau_2=\tau_s(t_2)$, $\tau_3=\tau_s(t_3)$, $\tau_4=\tau_m(t_4)$.

Moreover, $y_1$ and $y_2$ are measurements of $\tau_2-\tau_1$ and $\tau_4-\tau_3$, respectively, both subjected to random measurement errors. $d_1-d_2$ is small and the correlation between $d_1$ and $d_2$ as well as the correlation between $y_1$ and $y_2$ is strong when the upstream and downstream paths are the same. Measurements $y_1$ and $y_2$ are used to produce latency estimates $\hat{d}_1$ and $\hat{d}_2$ as $$\hat{d}_1(k+1)=f_1(\hat{d}_1(k),\hat{d}_2(k),z(k),y_1(k+1),y_2(k+1),\pi(k+1))$$

and $$\hat{d}_2(k+1)=f_2(\hat{d}_1(k),\hat{d}_2(k),z(k),y_1(k+1),y_2(k+1),\pi(k+1)),$$

for some functions $f_1$ and $f_2$, where k is the sample number, $\pi(k)$ is a vector of parameters, and z(k) is a vector evolving as $$z(k+1)=f_3(\hat{d}_1(k),\hat{d}_2(k),z(k),y_1(k+1),y_2(k+1),\pi(k+1)),$$

in turn for some function $f_3$, and wherein an estimate c of the correlation between $y_1$ and $y_2$ affects the computation of latency estimates via the parameters $\pi$ such that $\hat{d}_1-\hat{d}_2$ converges faster to zero when c is large and slower when c is small.

The filter 117 inputs, for each current sample, the quadruple with minimum round-trip time of the current sample at the end of the current sample interval and computes and outputting the slave clock offset O and slave clock drift T to be used when processing the next sample throughout the next sample interval.

The synchronisation module 118 inputs each timestamp quadruple ($\tau_1$, $\tau_2$, $\tau_3$, $\tau_4$) obtained during measurement, and computes and outputs a corresponding synchronised quadruple ($t_1$, $\tau_2+\Delta$, $\tau_3+\Delta$, $\tau_4$) where $\Delta=O+T(\tau_1-\tau_{start})$ and $\tau_{start}$ is the value of the master clock at the start of the current sampling period, wherein the measurements performed for each data packet are synchronised according to the corresponding synchronised timestamp quadruple.

In this example, the filter 117 is implemented using a Kalman filter in the following way. The difference between upstream latency and downstream latency $\delta(t)=d_1(t)-d_2(t)$ and the offset between the master clock and the slave clock $\theta(t)=\tau_s(t)-\tau_m(t)$ vary slowly in time, so that $\delta(t)$ and $\theta(t)$ are approximately constant in the time interval $[t_1, t_4]$ and the random measurement error of $y_i$ is $n_i$ such that the relationship between the measurements $y_1$ and $y_2$ and the upstream- and downstream delays are $y_1=d_1+\theta+n_1$ and $y_2=d_2-\theta+n_2$, respectively. Thus, both measurements are subject to the error $\theta$. The round-trip time is defined as $r=d_1+d_2$, and it follows that $d_1=(r+\delta)/2$ and $d_2=(r-\delta)/2$ yielding $$y_1 = \frac{r+\delta}{2} + \theta + n_1$$

and $$y_2 = \frac{r-\delta}{2} - \theta + n_2.$$

Further assume the following:
Measurement noises $n_i$ are zero-mean white-noise sequences with covariance $r_i$;
$\omega_i = 1 \ldots 4$, are 4 independent zero-mean white-noise sequences with covariance $q_i$, respectively;
The round-trip time evolves as a random walk $r(k+1)=r(k)+\omega_1(k)$;
The latency difference evolves as $\delta(k+1)=\alpha\delta(k)+\omega_2(k)$ where $0<\alpha<1$; The offset evolves as $\theta(k+1)=h\rho(k)+\omega_3(k)$, where h is the time interval between two consecutive samples and $\rho(k)$ is the relative drift between master clock and slave clock, which in turn is assumed to evolve as the random walk $\rho(k+1)=\rho(k)+\omega_4(k)$.

It is noted that one or several of these assumptions can be applied in the general case. In other words, the filter function 117 may generally be designed under one or several of these assumptions, similarly to the design assumptions discusses above.

By defining the measurement vector $y=[y_1 \ y_2]^T$, the state vector $x=[r \ \delta \ \theta \ \rho]^T$, the disturbance vector $\omega=[\omega_1 \ \omega_2 \ \omega_3 \ \omega_4]^T$, the noise vector $n=[n_1 \ n_2]^T$ and the pair of matrices $$A = \begin{bmatrix} 1 & 0 & 0 & 0 \\ 0 & \alpha & 0 & 0 \\ 0 & 0 & 1 & h \\ 0 & 0 & 0 & 1 \end{bmatrix}$$

and $$C = \begin{bmatrix} \frac{1}{2} & \frac{1}{2} & 1 & 0 \\ \frac{1}{2} & \frac{-1}{2} & -1 & 0 \end{bmatrix},$$

the assumptions above and the measurements can be formulated as $$x(k+1)=Ax(k)+\omega(k)$$

$$y(k)=Cx(k)+n(k),$$

yielding an estimate $\hat{x}$ of the state vector $$\hat{x}(k+1)=A\hat{x}(k)+P(k)C^T(R(k)+CP(k)C^T)^{-1}(y(k+1)-CA\hat{x}(k)),$$

by employing the Kalman filter, where $Q=\text{diag}[q_1 \ q_2 \ q_3 \ q_4]$, $R=\text{diag}[r_1 \ r_2]$, and where the symmetric $$P = \begin{bmatrix} p_{11} & p_{12} & p_{13} & p_{14} \\ p_{12} & p_{22} & p_{23} & p_{24} \\ p_{13} & p_{23} & p_{33} & p_{34} \\ p_{14} & p_{24} & p_{34} & p_{44} \end{bmatrix}$$

is given by the Riccati equation $$P(k+1)=AP(k)A^T-AP(k)C^T(R(k)+CP(k)C^T)^{-1}CP(k)A^T+Q(k).$$

The latency estimates are then obtained as $$\hat{d}_1 = \begin{bmatrix} \frac{1}{2} & \frac{1}{2} & 0 & 0 \end{bmatrix}\hat{x}$$

$$\hat{d}_2 = \begin{bmatrix} \frac{1}{2} & -\frac{1}{2} & 0 & 0 \end{bmatrix}\hat{x}.$$

In general, the covariances $q_i$ and $r_i$, which are defined as the expected values of $\omega_i(k)^2$ and $n_i(k)^2$, respectively, are not known and may be difficult to estimate. Instead, one may take the values of these to be design parameters of the proposed algorithm. Hence, going further, the intensities $q_i$ and $r_i$ may be adjusted in the recursive filter 117 to achieve desired convergence properties. A reasonable assumption is that the properties of the measurement noise for the upstream and downstream delays are equal, i.e. that $r_1=r_2=r_0$ for some positive $r_0$. Then it may be shown that the convergence properties of the estimates $\hat{x}_i$ are completely determined by the quotients $q_i/r_0$ (with $i=1 \ldots 4$). Hence, we may choose an arbitrary fixed value of $r_0$ which leaves $q_i$ available as design parameters to control the convergence rate of the estimate $\hat{x}_i$—faster convergence rate is achieved by increasing $q_i$ and slower convergence rate is achieved by decreasing $q_i$. This general behaviour of the convergence is achieved in steady-state when the Riccati equation has converged, i.e. for $k\to\infty$. Hence, by initializing the Riccati equation with a $P_0=P(0)$ that is different from its final value $$P_\infty = \lim_{k\to\infty} P(k),$$

it is possible to have different behaviour in the initial phase compared to the steady-state behaviour.

In conclusion, the most important tuning parameters of the Kalman filter are the disturbance covariances $q_i$, the convergence parameter a of the evolution of the delay difference, and the initial value matrix $P_0$ of the Riccati equation. In general, the values of these parameters should be adjusted so that the Kalman filter produces accurate estimates out of test data sets with known values of clock offset and delays.

Sufficiently small values of $q_3$ and $q_4$ in relation to $q_2$ will serve to keep $\hat{\rho}$ close to constant, such as within 10 ppm or less, and the offset estimate to follow $\hat{\theta}(k+1)=\hat{\theta}(k)+h\hat{\rho}(k)$ whereas the delay estimates $\hat{d}_1$ and $\hat{d}_2$ change in response to changes in the measurements. Moreover, $\alpha(k)$ is chosen close to 1, which will make the convergence of $\hat{\delta}(k)\to 0$ slow, allowing $\hat{d}_1$ and $\hat{d}_2$ to change independently of each other. This configuration, denoted A in the following, is useful when an upstream communication path through the network 10 is believed to be different from a downstream communication path through the network 10, leading to weakly correlated upstream/downstream delay measurements (upstream meaning from master to slave and vice versa). That the upstream and downstream paths can be assumed to be different can often be inferred using known external parameters, and may therefore in such cases be treated as a priori information in particular embodiments. In particular, the present method may include an initial step in which the upstream and downstream paths are analysed and determined to be treated as identical or different. Then, this assumption is used when applying the present calculations. The following are parameter values used in an exemplary run-through of a method according to the present invention consistent with configuration A:

| Parameter | Value |
|---|---|
| $r_0$ | 0.5 |
| $q_1$ | 0.11 |
| $q_2$ | 0.09 |
| $q_3$ | 0.000025 |
| $q_4$ | 0.000001 |
| $\alpha$ | 0.9 |

Conversely, when the upstream path is believed to be the same as the downstream path, so that the upstream/downstream delay measurements are strongly correlated, a different recursive filter 117 configuration, denoted B in the following, may be used. Namely, using sufficiently large values of $q_3$ and $q_4$ in relation to $q_2$ will cause the estimate of the latency difference to converge to 0 following $\hat{\delta}(k+1) = \alpha\hat{\delta}(k)$, while the clock parameter estimates $\hat{\theta}$ and $\hat{\rho}$ change in response to changes in the measurements. Moreover, $\alpha(k)$ is chosen closer to 0, which will make the convergence of $\hat{\delta}(k) \to 0$ fast, forcing $\hat{d}_1$ and $\hat{d}_2$ to converge to each other.

To automatically achieve the above-described adaption to whether upstream and downstream paths are the same or different, one may use the correlation estimate c(k) (between $y_1$ and $y_2$, see above). The recursive filter 117 can be configured such that the parameters $\alpha, q_2, q_3, q_4$ are made to vary in time depending on c(k) as $$\alpha(k) = \alpha_0 - bc(k)$$

$$q_2(k) = q_{20} - b_2 c(k)$$

$$q_3(k) = q_{30} + b_3 c(k)$$

$$q_4(k) = q_{40} + b_4 c(k)$$

for some non-negative constants $\alpha_0, q_{20}, q_{30}, q_{40}, b, b_2, b_3,$ and $b_4$.

In this way, configuration A (i.e., large $\alpha, q_2$ and small $q_3, q_4$) will be activated when the correlation estimate c(k) is small (close to 0) and configuration B (small $\alpha, q_2$ and large $q_3, q_4$) when c(k) is large (close to 1).

Another possible functionality of the algorithm is to let it estimate the clock parameters initially and then gradually go over to estimating the latencies which is useful if it can be assumed that the latencies are almost constant during the initial phase. The initial phase can be achieved by choosing the parameter values $\alpha, q_2, q_3, q_4$ according to configuration A but choosing the initial value $P_0$ of the Riccati equation close to a Pa, that would be the result from choosing $\alpha, q_2, q_3, q_4$ according to configuration B. In this way, as P(k) transitions from $P_0$ to its final value, the behaviour of the algorithm will transition from that of configuration B to configuration A.

Above, preferred embodiments have been described. However, it is apparent to the skilled person that many modifications can be made to the disclosed embodiments without departing from the basic idea of the invention.

For instance, even if the present method can be performed completely in-band, in cases where a particular device needs to be checked in terms of current latency it is in some embodiments possible that the inventive system in addition to said in-band messages also executes the sending of communication messages only for the purpose of creating network traffic to and from that particular device so as to be able to produce an updated latency estimation.

Apart from latency and delay, the present invention can also be used to produce reliable estimations of jitter (the difference between a minimum and a maximum delay or latency observed during a particular predefined time interval).

It is understood that determined latency estimates and/or offset/drift corrected time measurement data can be sent to said external system or to the user for further action, as the case may be. Alternatively or additionally, these data may be stored in a system 100 internal database for later use, such as for statistical use in order to perform predictions based on historical data.

Normally, the calculated values for relative clock drift T and offset O are themselves not communicated externally to the system 100, but kept as system 100 internal data.

In general, the various embodiments described herein, including the detailed examples, should be seen as examples of different aspects of a methodology used by the present invention to produce latency estimates in a network. As such, all the techniques and design principles discussed herein are freely combinable, subject only to compatibility.

Hence, the invention is not limited to the described embodiments, but can be varied within the scope of the enclosed claims.

What is claimed is:

1. A method comprising the steps:
   a) sending a first communication from a first device to a second device, which first device has a first clock being local to the first device, which second device has a second clock being local to the second device, which first and second devices are both connected for digital communication to a digital communication network, measuring a first communication send time ($\tau_1$) using the first clock and measuring a first communication receive time ($\tau_2$) using the second clock;
   b) sending a second communication from the second device to the first device, measuring a second communication send time ($\tau_3$) using the second clock and measuring a second communication receive time ($\tau_4$) using the first clock;
   c) calculating a first measured delay ($y_1$) as the difference between the first communication receive time ($\tau_2$) and the first communication send time ($\tau_1$) and calculating a second measured delay ($y_2$) as the difference between the second communication receive time ($\tau_4$) and the second communication send time ($\tau_3$);
   d) providing said first measured delay ($y_1$) and said second measured delay ($y_2$) to a recursive filter function arranged to estimate a first latency ($d_1$) and a second latency ($d_2$) based on said first measured delay ($y_1$), said second measured delay ($y_2$), a value for the first latency ($d_1$) previously estimated by said recursive filter function and a value for the second latency ($d_2$) previously estimated by said recursive filter function; and
   e) iterating from step a.

2. The method according to claim 1, wherein the recursive filter function is arranged to assume that a difference ($\delta$)

between the first latency ($d_1$) and the second latency ($d_2$) is constant over steps a) and b) of one single iteration of the method.

3. The method according to claim 1, wherein the recursive filter function is arranged to assume that a difference ($\delta$) between the first latency ($d_1$) and the second latency ($d_2$) decreases across iterations, or is zero, possibly apart from a random term.

4. The method according to claim 1, wherein the recursive filter function is arranged to assume that a time offset (O) between the first clock and the second clock is constant over steps a) and b) of one single iteration of the method.

5. The method according to claim 1, wherein the recursive filter function is arranged to assume that the second clock is associated with a constant or variable offset drift (T) in relation to the first clock.

6. The method according to claim 1, wherein the recursive filter function comprises a Kalman filter.

7. The method according to claim 6, wherein the method further comprises determining a residual value with respect to said estimated first ($d_1$) and/or second ($d_2$) latency, or with respect to a sum of the estimated first ($d_1$) and second ($d_2$) latencies.

8. The method according to claim 1, wherein the method further comprises the step of calculating an estimated current second clock offset (O) and drift (T), in relation to the first clock, based on the estimated first ($d_1$) and second ($d_2$) latencies.

9. The method according to claim 1, wherein steps a)-c) are iterated over a predetermined sampling period, and wherein step d) is thereafter performed using the shortest first measured delay as the first measured delay ($y_1$) and the shortest second measured delay as the second measured delay ($y_2$), or alternatively using the first and second measured delay from the step c) iteration associated with the smallest sum of first and second measured delays as the first ($y_1$) and second ($y_2$) measured delays.

10. The method according to claim 9, wherein in step d) a sample timestamp is provided to the recursive filter function, which sample timestamp is determined in relation to the predetermined sampling period rather than in relation to the measurement time of the first ($y_1$) or second ($y_2$) measured delays provided to the recursive filter function.

11. The method according to claim 9, wherein during said predetermined sampling period steps a)-c) are iterated at least ten times.

12. The method according to claim 9, wherein the first and second communications each comprises information unrelated to the estimation of the first ($d_1$) and second ($d_2$) latency.

13. The method according to claim 9, in that the method further comprises, in step d), the recursive filter function determining a relative time offset (O) between the first clock and the second clock as well as a relative offset time drift (T) between the first clock and the second clock, and in that the method further comprises the step of synchronizing said first and second clocks based on said relative time offset (O) and relative time offset drift (T).

14. A system comprising one or more processors and memory, wherein the one or more processors have access to the memory and are individually or collectively configured to, at least, iteratively:

receive or record a measurement of a first communication send time ($\tau_1$) measured using a first clock local to a first device and a first communication receive time ($\tau_2$) measured using a second clock local to a second device, which measurements are made in relation to a first communication sent from the first device to the second device;

receive or record a measurement of a second communication send time ($\tau_3$) measured using the second clock and a second communication receive time ($\tau_4$) measured using the first clock, which measurements are made in relation to a second communication sent from the second device to the first device;

calculate a first measured delay ($y_1$) as the difference between the first communication receive time ($\tau_2$) and the first communication send time ($\tau_1$), and calculate a second measured delay ($y_2$) as the difference between the second communication receive time ($\tau_4$) and the second communication send time ($\tau_3$); and estimate, using a recursive filter function, a first latency ($d_1$) and a second latency ($d_2$) based on said first measured delay ($y_1$), said second measured delay ($y_2$), a value for the first latency ($d_1$) previously estimated by said recursive filter function and a value for the second latency ($d_2$) previously estimated by said recursive filter function.

15. Non-transitory computer-readable media storing instructions that, when executed by one or several computer processors, cause the one or several computer processors to perform steps comprising:

a) receiving or recording a measurement of a first communication send time ($\tau_1$) measured using a first clock local to a first device and a first communication receive time ($\tau_2$) measured using a second clock local to a second device, which measurements are made in relation to a first communication sent from the first device to the second device;

b) receiving or recording a measurement of a second communication send time ($\tau_3$) measured using the second clock and a second communication receive time ($\tau_4$) measured using the first clock, which measurements are made in relation to a second communication sent from the second device to the first device;

c) calculating a first measured delay ($y_1$) as the difference between the first communication receive time ($\tau_2$) and the first communication send time ($\tau_1$), and calculating a second measured delay ($y_2$) as the difference between the second communication receive time ($\tau_4$) and the second communication send time ($\tau_3$);

d) estimating, using a recursive filter function, a first latency ($d_1$) and a second latency ($d_2$) based on said first measured delay ($y_1$), said second measured delay ($y_2$), a value for the first latency ($d_1$) previously estimated by said recursive filter function and a value for the second latency ($d_2$) previously estimated by said recursive filter function; and e) iterating from step a.

16. The non-transitory computer-readable media according to claim 15, wherein the recursive filter function is arranged to assume that a difference ($\delta$) between the first latency ($d_1$) and the second latency ($d_2$) is constant over steps a) and b) of one single iteration.

17. The non-transitory computer-readable media according to claim 15, wherein the recursive filter function is arranged to assume that a difference ($\delta$) between the first latency ($d_1$) and the second latency ($d_2$) decreases across iterations, or is zero, possibly apart from a random term.

18. The non-transitory computer-readable media according to claim 15, wherein the recursive filter function is arranged to assume that a time offset (O) between the first clock and the second clock is constant over steps a) and b) of one single iteration.

19. The non-transitory computer-readable media according to claim 15, wherein the recursive filter function is arranged to assume that the second clock is associated with a constant or variable offset drift (T) in relation to the first clock.

20. The non-transitory computer-readable media according to claim 15, wherein the instructions cause the one or several computer processors to perform the step of calculating an estimated current second clock offset (O) and drift (T), in relation to the first clock, based on the estimated first ($d_1$) and second ($d_2$) latencies.

* * * * *